(12) United States Patent
Geppert et al.

(10) Patent No.: US 6,328,352 B1
(45) Date of Patent: Dec. 11, 2001

(54) PIPE COUPLING

(75) Inventors: Helmut Geppert, Karlstein; Peter Scheit, Frankfurt am Main, both of (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/483,874

(22) Filed: Jan. 18, 2000

(30) Foreign Application Priority Data

Jan. 18, 1999 (DE) .............................................. 199 01 663

(51) Int. Cl.$^7$ ....................................................... F16L 17/02
(52) U.S. Cl. ........................... 285/373; 285/369; 285/104
(58) Field of Search ..................................... 285/104, 105, 285/340, 369, 373, 348

(56) References Cited

U.S. PATENT DOCUMENTS

| | | | |
|---|---|---|---|
| 817,300 | * | 4/1906 | David ................................ 285/104 X |
| 2,201,372 | * | 5/1940 | Miller .................................... 285/105 |
| 2,225,208 | | 12/1940 | Crichmer . |
| 2,793,883 | * | 5/1957 | Main, Jr. ............................ 285/369 X |
| 2,956,820 | * | 10/1960 | Cenzo .................................... 285/105 |
| 3,052,491 | * | 9/1962 | Grass ................................. 285/373 X |
| 3,116,078 | | 12/1963 | Scherer . |
| 3,432,189 | * | 3/1969 | Buller ................................ 285/340 X |
| 3,610,654 | * | 10/1971 | Torres ................................ 285/373 X |
| 3,724,878 | | 4/1973 | Ford . |
| 4,316,053 | * | 2/1982 | Rieffle ............................... 285/369 X |
| 5,280,970 | * | 1/1994 | Straub ............................... 285/373 X |
| 5,769,467 | | 6/1998 | Bridges . |

FOREIGN PATENT DOCUMENTS

| | | |
|---|---|---|
| GM 7 104 189 | 5/1971 | (DE) . |
| 3826114 * | 2/1990 | (DE) ................................ 285/373 X |
| 0 913 613 A1 | 6/1999 | (EP) . |

* cited by examiner

Primary Examiner—Lynne H. Browne
Assistant Examiner—David E. Bochna
(74) Attorney, Agent, or Firm—Darby & Darby

(57) ABSTRACT

A pipe coupling includes two sealing rings, each corresponding to one of the pipes. A sleeve is disposed within a retention device. The sleeve has axial end portions, each of which rests against one face of the sealing rings. The retention device has inwardly open grooves, one side wall of which rests against the respective axially inner sides of the axial end portions of the sleeve. The other side wall of the inwardly open grooves exerts an axial force on the other faces of the sealing rings as the clip is clamped, thereby pressing the sealing rings against the pipes.

19 Claims, 4 Drawing Sheets

PIPE COUPLING

BACKGROUND OF THE INVENTION

1. Field of the Invention

The present invention relates to a pipe coupling for connecting pipes having unprofiled free end portions that face one another. The pipe coupling includes just one clamping clip that can be moved into the clamped position by a tensioning device, thereby reducing the diameter of the clip. The clamping clip is interrupted in the circumferential direction to permit its diameter to be reduced during the clamping process and to permit its diameter to be increased to insert further components of the pipe coupling into the clip. An annular sealing ring corresponds to each pipe and is made of a deformable material so that it may press on the circumference of the free end portion of the respective pipe. A retention device extends over the major part of the circumference of the annular sealing rings.

2. Discussion of the Related Art

U.S. Pat. No. 3,116,078 to Scherer discloses a pipe coupling that includes a collar 18 of rubber or rubber-like material. Collar 18 bridges the gap between the mutually facing ends of two pipes that have been introduced into the pipe coupling. The radially inner surface of the collar comes into contact with the fluid flowing through the pipes. If the pipe coupling is used for pipes that carry high temperature or aggressive fluids (e.g., the exhaust gases in exhaust pipes, especially those of an internal combustion engine), the sealing collar must be produced from an expensive material that can withstand these types of fluids for a sufficient length of time. Conventional elastomers are unsuitable for this purpose. Because the ends of the pipes are not always placed directly against one another, but are often axially spaced a relatively large distance apart, a relatively large amount of expensive sealing material is required in the production of the sealing collar.

SUMMARY OF THE INVENTION

It is an object of the present invention to provide a pipe coupling that uses less material for the sealing device, ensures a high leak tightness of the joint and also provides a longer service life for the sealing device, especially at relatively high temperatures.

This and other objects are achieved in accordance with a currently preferred exemplary embodiment of the present invention by using a sealing device that comprises two sealing rings, each of which is assigned to one of the pipes. An annular sleeve is disposed radially within the retention device. The sleeve has end portions that are bent obliquely outwardly toward the sealing rings. An inner surface of each of the end portions rests against the axially inner face of one of the sealing rings. A retention device has two radially inwardly open, circumferentially extending grooves of approximately V-shape in cross-section. The V-shaped grooves are interrupted to match interruptions in the retention device. An inner surface of one side wall of each of the grooves rests against the outer surface of the mutually facing sides of the bent axial end portions of the sleeve. In a clamped position, an inner surface of the other side wall of each groove exerts an axial force on the axially outer face of each of the sealing rings.

Thus, in accordance with this exemplary embodiment, less sealing material is required than conventional pipe couplings, regardless of the axial distance between the free axial ends of the connected pipes. The sealing rings are, to a large extent, enclosed and, therefore, do not to any great extent come into contact with the fluid in the pipes. Thus, a relatively large degree of freedom is permitted in choosing of the sealing ring material. Moreover, an axial force is exerted on the faces of the sealing rings as the clip is clamped. The axial force causes the sealing material to yield radially inwardly so that it is pressed, with a corresponding high pressure, against the outer surface of the pipes. The leak tightness of the joint is, therefore, guaranteed, even when the internal pressures in the pipes are high. Thus, the pipe coupling in accordance with the present invention is particularly suitable for exhaust pipes of internal combustion processes, especially internal combustion engines in motor vehicles.

A tapered cover ring is preferably disposed between the inner surface of the other side wall of each of the grooves and the axially outer face of the sealing rings. The axially outer faces of the sealing rings are directed away from one another toward opposite axial ends of the clip. The tapered cover rings ensure that, even in the region of one or more interruptions in the circumference of the clip, clip strap and/or the retention device, the sealing rings are to a large extent protected even on their axially outer faces from aggressive fluids (e.g., atmospheric oxygen and/or water-containing road salt from melted snow), which exhaust pipe systems of motor vehicles are frequently exposed to.

Radially outside of the sealing ring, an axial end portion of the tapered cover ring axially overlaps an axial end portion of the bent portion of the sleeve. Thus, the sealing rings are protected from aggressive fluids over their entire circumference by these overlapping axial end portions, even on the outer radial side of the sealing rings. The overlapping end portions also facilitate centering of the sleeve and cover rings during the assembly of the pipe coup ling . The radially inner surface of these axial end portions also act as a stop to limit the axial compression of the sealing rings.

The retention device has two radially inward projecting corrugation peaks at each of its axial end portions. The mutually adjacent side walls of the peaks, respectively, form the side walls of one of the V-shaped grooves. Thus, the V-shaped grooves are formed from a simple design. In an alternate embodiment, the clip itself can form the retention device by having two radially inward projecting corrugation peaks at each of its axial end portions, thereby eliminating the retention device as a separate part.

Alternatively, the retention device can be in the form of a collar that is interrupted in the circumferential direction and is disposed radially within the clip. This type of collar is easy to form from sheet material that is resistant to aggressive fluids. For example, the sheet material can be sheet metal, which is a thin-walled material that nevertheless withstands high clamping forces.

A generally conical retaining ring is disposed between the axially outer side wall of each of the axially outer corrugation peaks and each of the radial flanges of the clip. The flanges are bent radially inwardly towards an axial center line of the pipe coupling at each axial end of the clip. Each of the flanges have at least one interruption. The retaining ring has on its radially inner rim claws for engaging into the pipe material. An axial inner surface rests against the axially outer side wall of the axially outer corrugation peak of the radially inward projecting corrugation peaks in the retention device. The retaining rings increase the axial load bearing capacity of the pipe joint at high internal pressures. Under increasing higher pressure, the retaining rings straightening up (i.e., they move to a more radial direction), thereby digging ever more firmly into the pipe material.

An axially outer side wall of each of the axially outer corrugation peaks merges into a radially outwardly projecting flattened corrugation peak. The generally conical retaining ring rests in an axially outer bend of the radially outwardly projecting corrugation peak. With this construction, the retaining rings increase the axial load bearing capacity of the pipe joint at high internal pressures. To make the clip more flexible, the flanges on the axial ends of the clip can be omitted.

The retention device preferably has at least one length compensation corrugation to compensate for a change in the length of the retention device during the clamping of the clip.

The length compensation corrugation preferably includes radial apertures. Radial apertures increase the flexibility of the length compensation corrugation and, thereby, make it easier to clamp the clip.

The sealing rings are preferably made of a heat-resistant material. The sealing rings should preferably withstand temperatures of up to 1000° C., as can occur, for example, in exhaust pipes of internal combustion engines.

The sealing rings are preferably made of any one of: graphite with annular metal lamellae embedded therein; a cold deformable metal such as copper or aluminum; or an elastomeric material. Sealing rings that are made of graphite and/or an easily deformable metal can withstand very high temperatures and can nevertheless yield radially inwardly and press against the pipes under the axial forces brought about by the axial clamping force exerted by the clip.

The metal sealing rings have teeth on their radially inner surface for engaging into the pipe material. The sealing rings then additionally contribute with the retaining rings or, if the retaining rings are not present, contribute on their own to axially securing the joint.

The sleeve can optionally be provided with a radial hole. A piece of tube is secured to a radially outer edge of the radial hole. The piece of tube can be a threaded bush and extends through a pair of coaxial holes in the clip and the retention device, respectively. A sensor can be introduced through this piece of tube. The sensor can be a gas sensor, in particular a lambda probe of a motor-vehicle exhaust-gas catalytic converter. Alternatively, the piece of tube can be a branch pipe or can be used to connect to a branch pipe.

The tensioning device preferably includes only one clamping bolt. Thus, not only is the need for additional clamping bolts eliminated, but also the pipe coupling is relatively simple to operate. Despite its ease of operation, the pipe coupling according to the present invention nevertheless exerts a high clamping force on the pipes, especially if the clamping bolt engages transversely in pins or sleeves that are rotatably mounted in loops on the ends of the clip strap of the clip. The clamping force of the clip is distributed uniformly between the two sealing rings. Because of the relatively small axial width of the two sealing rings, which corresponds to a small surface area that the sealing rings are applied against the outer surface of the pipes, the sealing rings press against the pipes with a high surface pressure, even if a relatively small clamping force is exerted by means of the clamping bolt.

In the clamped position, a minimal radial clearance exists from the pipes to the remainder of the pipe coupling excluding the sealing rings and the retaining rings which contact the pipes. Thus, when the pipes are carrying hot fluids relatively little heat is transferred to the clip and, in particular, to the tensioning device. Therefore, the tensioning device is not loosened due to vibration and thermal expansion.

The retention device is secured within the clip in an angular position relative to the clip in which circumferential interruptions in the clip and the retention device do not overlap (i.e., they angularly spaced from one another). Thus, direct penetration of impurities into the interior of the retention device is, to a large extent, prevented.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
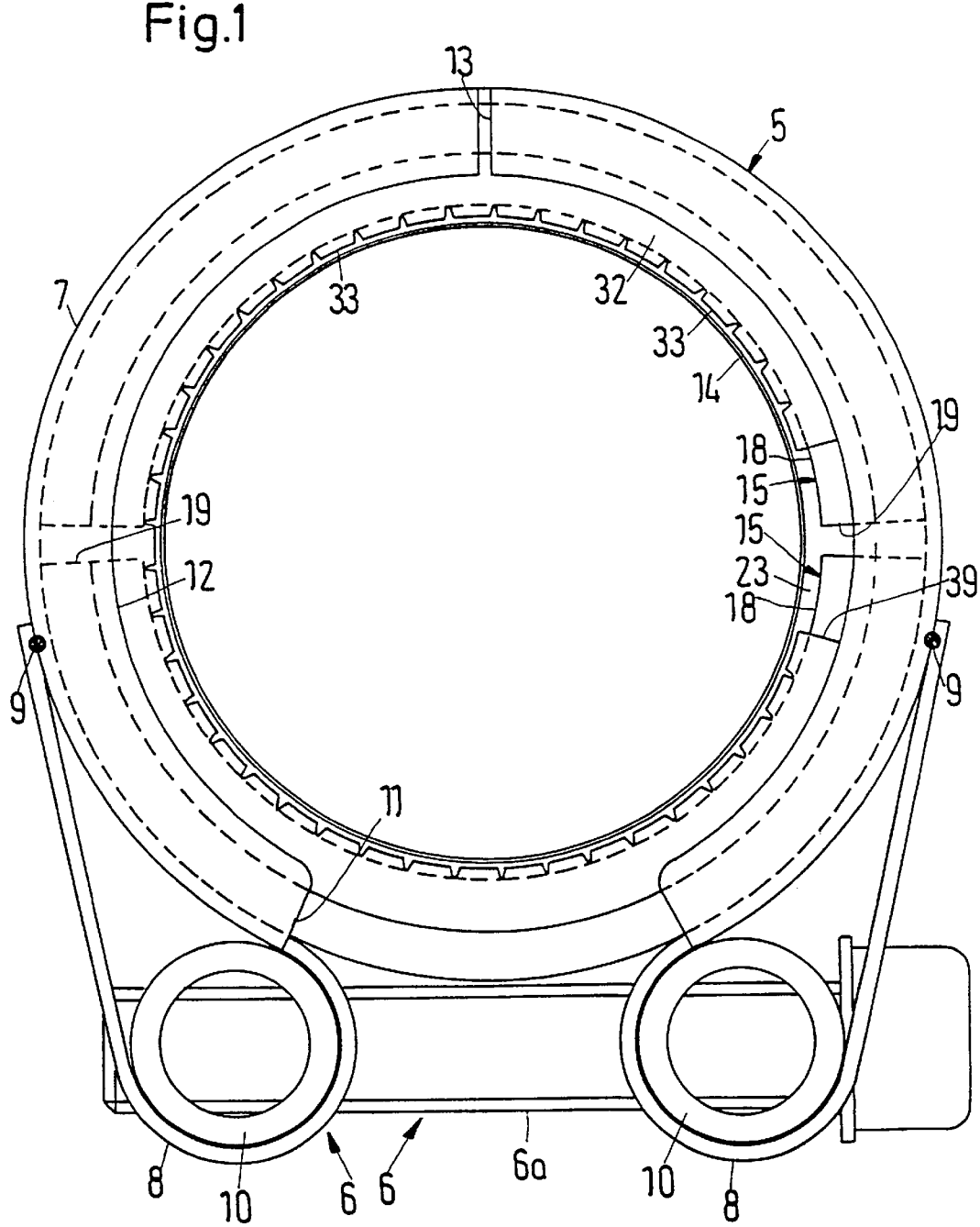
FIG. 1 is an axial end view of a first exemplary embodiment of a pipe coupling according to the present invention.
Figure 2:
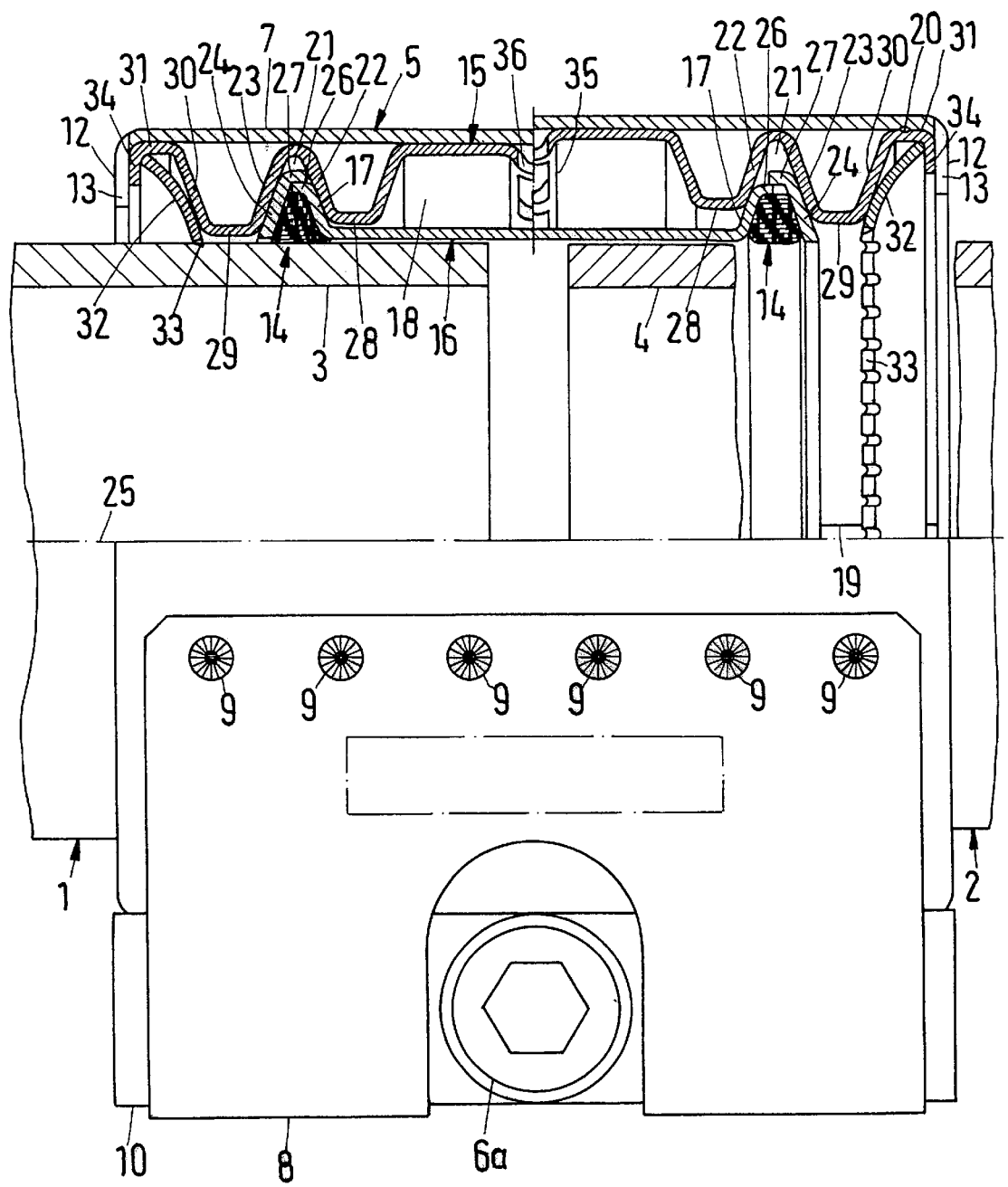
FIG. 2 is a front view, partially shown in cross-section, of the pipe coupling of FIG. 1, with end portions of the pipes to be connected introduced axially into the pipe coupling, the pipe coupling is shown in the clamped position in the left-hand half of the figure and in the unclamped position in the right-hand half of the figure.

Referring now to FIGS. 1–2, a pipe coupling, for connecting pipes 1 and 2 having substantially smooth, unprofiled end sections 3 and 4, respectively, according to the present invention is illustrated. Pipes 1 and 2, may be, for example, exhaust pipes of an internal combustion engine at the point where they connect to a muffler or a catalytic converter.

The pipe coupling includes a clip 5. Clip 5 has a clip strap 7 that is split in the circumferential direction, thereby forming an incomplete ring. The ends of the clip strap 7 are bent radially outwardly and back to form loops 8. The ends of clip strap 7 are preferably fastened to the main portion of the clip strap by spot welds 9. Loops 8 can be drawn together in the circumferential direction by means of a tensioning device 6, in the form of a tensioning bolt 6a. Sleeves 10 (or solid pins, not shown) are rotatably mounted in loops 8. Tensioning device 6 includes only one clamping bolt 6a, which transversely engages through coaxial radial bores in sleeves 10. The sleeve illustrated to the right in FIG. 1 has a non-threaded bore while the sleeve illustrated to the left has a threaded bore to mate with the threads of clamping bolt 6a. A flange 12 is disposed at each axial end of clip strap 7. Flange 12 is bent radially inwardly relative to the axial center line 25 of the pipe coupling. Flange 12 has at least one, and may have a plurality of interruptions 13, in the form of a radial slot, to make it easier to expand or bend open clip 5 to insert further components of the pipe coupling into the clip.

Clip 5 also comprises a sealing device that includes two continuous deformable annular sealing rings 14 and a retention device 15. Retention device 15 is in the form of a collar and extends within clip 5 over or radially outside of the majority of the circumference of sealing rings 14. In the clamped position, one of the sealing rings 14 is disposed about each one of the pipes 1, 2.

A cylindrical sleeve 16 is disposed radially within retention device 15. Cylindrical sleeve 16 has a continuous circumference and has end portions 17 that are bent radially obliquely outwardly in a direction toward sealing rings 14. An inner surface of each end portion 17 rests against the axially inner face of one of the sealing rings 14.

Retention device 15 is preferably made of a relatively thin-walled steel and is formed from two half-shells 18. Half-shells 18 have two interruptions 19 that extend in the circumferential direction. Retention device 15 is secured to clip 5 in a region of at least one of the half-shells 18 by, for example, a spot weld 20, in an angular position relative to clip 5 so that the interruptions 11, 13 in the clip 5 and the interruptions 19 in the retention device 15 do not overlap thereby largely preventing the ingress of dirt and/or an aggressive fluid, in particular atmospheric oxygen, into the interior of the retention device 15 from the axial ends of the pipe coupling. Retention device 15 also has two inwardly open, circumferentially extending grooves 21 of approximately V-shape in cross-section. V-shaped grooves 21 have circumferential interruptions that match the circumferential interruptions 19 in the retention device 15. An inner surface of one side wall 22 of each of the grooves 21 rests against the outer surface of the mutually facing sides of the bent portions 17 of the sleeve 16. An inner surface of side wall 23 of each of the grooves 21 exerts an axial force on the axially outer face of each of the sealing rings 14 when the clip 5 is in the clamped position. A tapered cover ring 24 is disposed between the inner surface of the other side wall 23 of each groove 21 and the axially outer face of each of the sealing rings 14, which outer faces are directed away from one another (i.e., toward the axial ends of the clips). Bent portions 17 of sleeve 16, as well as, side walls 22 and 23 of grooves 21 and cover rings 24 all extend at the same slope angle relative to a transverse plane that is perpendicular to an axial center line 25. The transverse plane is parallel to a center plane of sealing rings 14 and grooves 21. The slope angle is approximately between about 15° and about 25°, and is preferably about 20°.

Axial end portions 26 and 27 are formed on the bent portions 17 of sleeve 16 and cover rings 24, respectively. End portions 26, 27 axially overlap one another radially outside of the sealing ring 14 against which they rest as shown in FIG. 2.

Retention device 15 has two radially inwardly projecting corrugation peaks 28 and 29 at each of its axial end portions. The mutually adjacent side walls 22, 23 of peaks 28, 29, respectively form the side walls of one of the V-shaped grooves 21. The axially outer side wall 30 of each axially outer corrugation peak 29 merges into an axially outwardly projecting flattened corrugation peak 31. Retention device 15 has a length compensation corrugation 35 in its axial center, which has rectangular radial apertures 36.

A generally conical retaining ring 32 is disposed between the axially outer side wall 30 and each of the flanges 12. Each retaining ring 32 has, on its radially inner rim, claws 33 for engaging into the pipe material. An axially inner surface portion of retaining ring 32 rests against the axially outer side wall 30 of the axially outer corrugation peak 29. A radial outer rim of each of the retaining rings 32 rests in the axially outer bend of the radially outward projecting flattened corrugation peak 31. Flanges 12 of each clip 5 rest against the axially outer side walls 34 of the axially outer corrugation peaks 31. But it is also possible to omit side walls 34, with the result that each of the retaining rings 32 is supported in the bend of flanges 12. It is also possible to omit flanges 12 so that the retaining rings 32 are supported in the outer bend of peaks 31 as described above.

Figure 5:
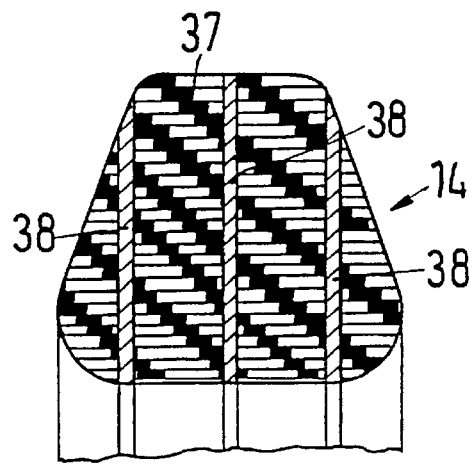
FIG. 5 is an enlarged axial sectional view of a sealing ring.

Sealing rings 14 are preferably made of a heat-resistant material which can withstand temperatures of up to 1000° C. As FIG. 5 shows more clearly, the sealing rings 14 are preferably made of graphite 37 with parallel annular lamellae 38 of metal, preferably steel, embedded therein. A softer metal, such as copper or aluminum, could be used instead of steel.

In the unclamped position, pipes 1 and 2 are introduced, in the axial direction, into the pipe coupling. To bring clip 5 into the clamped position, clamping bolt 6a is rotated, thereby causing the clip diameter to be reduced. Thus, retention device 15 moves radially inwardly from the unclamped position illustrated to the right in FIG. 2 to the clamped position illustrated to the left in FIG. 2. In the clamped position, retention device 15 exerts an axially acting force in opposite directions on portion 17 and cover ring 24 by means of the side walls 22 and 23 of groove 21, respectively. Portions 17 and cover rings 24 are thereby compressed axially, causing their end portions 26 and 27 to overlap further, up until end portion 26 abuts against the side wall of the adjacent cover ring 24. This axial compression of portion 17 and cover ring 24 causes the sealing ring material, in particular the graphite 37, to be deformed and forced radially inwardly against the respective pipe 1, 2. The deformation of the sealing ring 14 is limited by the abutment of end portions 26 against the side wall of the adjacent cover ring 24. During this clamping process, portions 17 and cover rings 24 effect radial guidance of the side walls 22, 23 of the grooves 21 without subjecting sealing rings 14 to stress due to friction. Sleeve 16 and its portions 17 simultaneously ensure that a hot and/or aggressive fluid flowing through pipes 1, 2 cannot come into contact with a relatively large area of the sealing rings 14. The cover rings 24 additionally prevent an aggressive fluid, in particular atmospheric oxygen, from coming into contact with a relatively large area of the sealing rings 14 from the outside through interruptions 19.

As the clip 5 is clamped, cover rings 24 are displaced axially toward the center. The axial length of retention device 15 is simultaneously reduced to some extent. This change in length is compensated for by the length compensation corrugation 35 because the other corrugations in the retention device 15 do not permit such a length compensation due to their relatively high stiffness. The apertures 36 in the length compensation corrugation 35 permit retention device 15 to be particularly flexible because corrugation 35 is formed only by the axial webs remaining between apertures 36.

As clip 5 is clamped, claws 33 of retaining rings 32 are forced deeper into the pipe material. Therefore, axial forces exerted on the pipes 1, 2 by the internal fluid pressure, which have a tendency to force pipes 1 and 2 axially apart, are absorbed by the retaining rings 32. Because of the generally conical shape of the retaining rings 32, they have a tendency to straighten somewhat further into the vertical position when pipes 1 and 2 move axially apart. Thus, as the internal pressure on the pipes increases, the claws 33 are forced further into the pipe material and, simultaneously increase the capacity of the pipe connection to withstand higher axial tensile loads. Retaining rings 32 are inserted within clip 5 so that its interruption 39 is placed in an angular position relative to the retention device 15 such that they cover one interruption 19 at each axial end of the retention device 15 (see FIG. 1).

Figure 3:
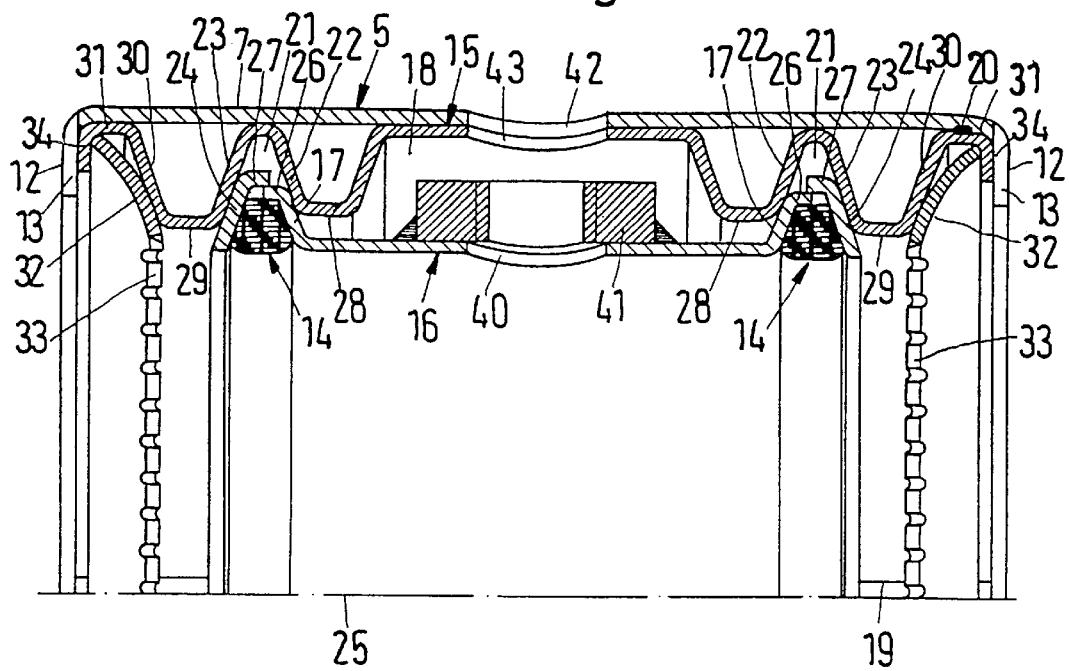
FIG. 3 is an axial sectional view of the pipe coupling according to a second embodiment of the present invention.

Referring now to FIG. 3, a second embodiment of a pipe coupling according to the present invention is illustrated. This embodiment of the pipe coupling according to the present invention differs from the embodiment illustrated in FIGS. 1 and 2 only in that sleeve 16 has a radial hole 40. A piece of tube 41 is secured at the radially outer edge of the radial hole 40. Tube 41 has an internal thread which is accessible through coaxial holes 42 and 43 in clip 5 and retention device 15, respectively. If the pipes 1 and 2 are exhaust pipes of an internal combustion engine, it is possible to screw a sensor (e.g., a gas sensor, in particular a lambda probe) into tube 41, through holes 42, 43. Pipe 1 may be connected to the internal combustion engine and pipe 2 may be connected to a muffler. In this illustrative embodiment, there is no length compensation corrugation illustrated, like length compensation corrugation 35 in the embodiment shown in FIGS. 1 and 2, but it may likewise be provided if needed.

Figure 4:
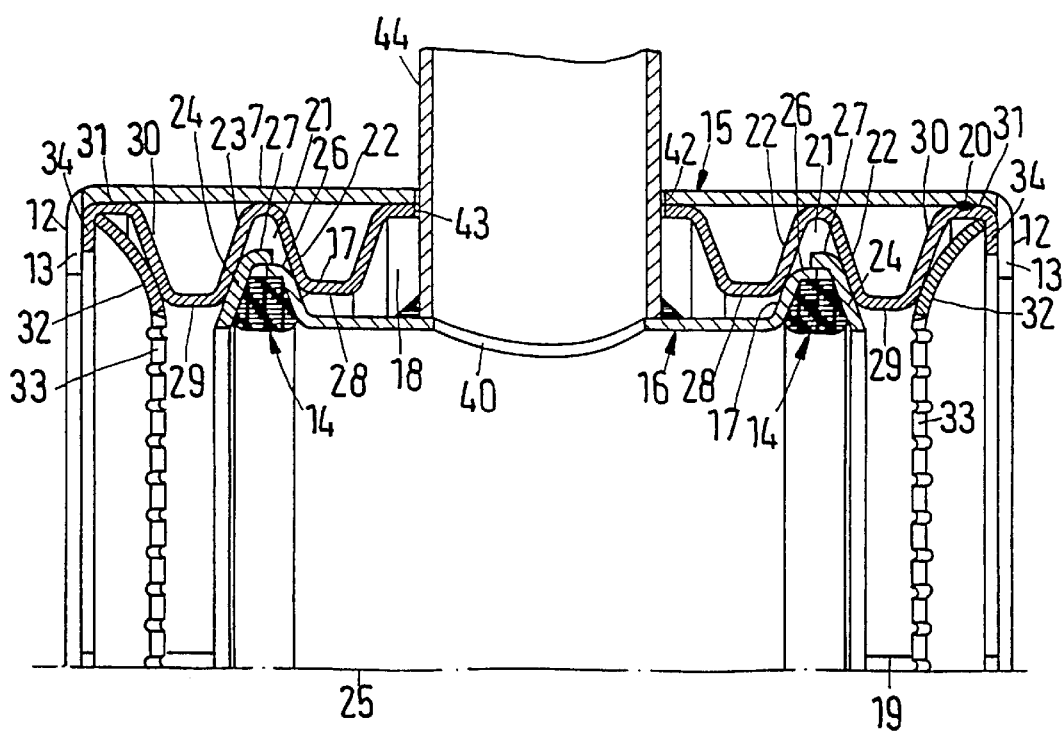
FIG. 4 is an axial sectional view of the pipe coupling according to a third embodiment of the present invention.

Referring now to FIG. 4, a third embodiment of a pipe coupling according to the present invention is illustrated. This illustrative embodiment of the pipe coupling according to the present invention differs from the embodiment illustrated in FIG. 3 only in that a piece of tube 44 is secured on the radially outer edge of hole 40 and passes radially to the outside through holes 42 and 43. Tube 44 can be, for example, a branch pipe or a connection stub.

In another modification, clip 5 can be provided with corrugations corresponding to corrugations 28, 29, so that the clip itself simultaneously acts as a retention device. Thus, the use of retention device 15 as a separate collar is eliminated.

Figure 6:
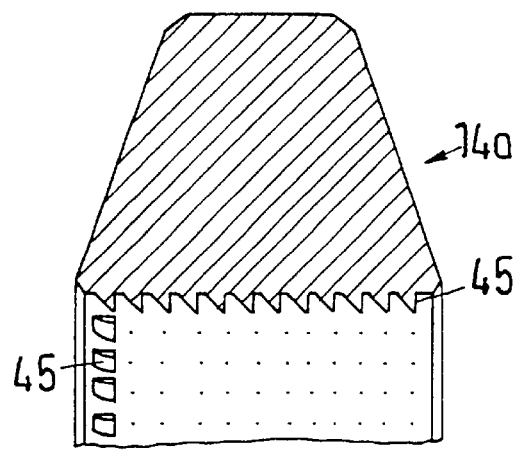
FIGS. 6–8 are enlarged axial sectional views of other embodiments of the sealing ring according to the present invention.
Figure 7:
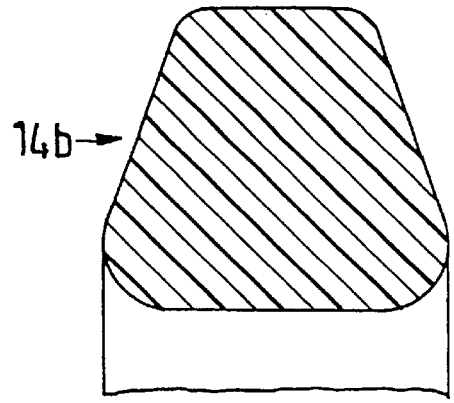
Figure 8:
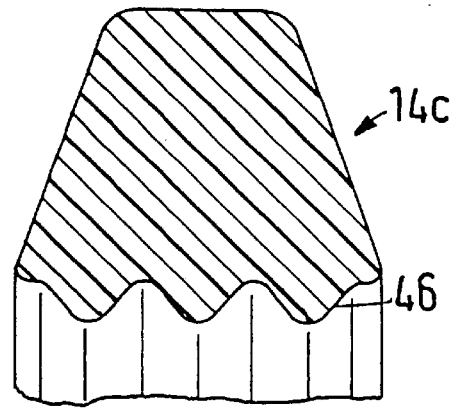

Referring now to FIGS. 6, 7 and 8, modifications in the sealing ring 14 are illustrated. Sealing ring 14a as shown in FIG. 6, is made of a metal material, such as copper or aluminum, which can be deformed easily when cold. Sealing ring 14a preferably has teeth 45 on its radially inner sealing face. Most of the teeth 45 are represented only as points in the drawing to simplify the illustration. As the clip 5 is clamped, teeth 45 press radially into the material of the pipes 1, 2 and, therefore, contribute to the axial securing of pipes 1 and 2. In accordance with a further modification of the pipe coupling, the retaining rings 32 can be omitted.

The sealing ring 14b, as shown in FIG. 7, is made of a heat-resistant elastomeric plastic. The cross-section of the sealing ring 14b can be circular instead of the approximately trapezoidal cross-section, as illustrated in FIGS. 5 and 7.

The sealing ring 14c, as shown in FIG. 8, is made of a heat-resistant elastomeric plastic, but has encircling sealing lips 46 on its radially inner sealing face.

Further modifications of the sealing rings are also possible. For example, the sealing rings can be hollow with a circular or C-shaped cross-section and can be made of an easily deformable metal, such as, for example, copper or aluminum.

With the exception of the sealing rings 14, 14a–14c and the retaining rings 32 that may be present, the pipe coupling has a minimal radial clearance from the pipes 1, 2 in the clamped position. Thus, only a small amount of heat is transferred to the pipe coupling from pipes 1, 2 when they are carrying hot fluid. The air cushion between sleeve 16, retention device 15 and clip 5 likewise advantageously contributes to ensuring that the temperature of the fluid is not fully transferred to the individual components, including the clamping bolt 6a, since the air acts as an insulator.

Having described presently preferred exemplary embodiments of a pipe coupling in accordance with the present invention, it is believed that other modifications, variations and changes will be suggested to those skilled in the art in view of the teachings set forth therein. It is, therefore, to be understood that all such modifications, variations, and changes are believed to fall within the scope of the present invention as defined by the appended claims.

What is claimed is:

1. A pipe coupling for connecting a first pipe to a second pipe, each of said pipes having unprofiled end sections, said pipe coupling comprising:

a first annular sealing ring and a second annular sealing ring, in a clamped position, each of said sealing rings holding the unprofiled pipe end section of one of said pipes in a sealed manner, each of said sealing rings having an axially inner face and an axially outer face;

a clamping clip surrounding both of said sealing rings, said clamping clip having a clip strap having a first end and a second end, a first clamping jaw formed at said first end, a second clamping jaw formed at said second end, said clamping jaws being drawn together by a tensioning device thereby reducing a diameter of said clamping clip, said clip strap having radially inwardly directed projecting flanges on each of its axial ends;

a retention device being disposed radially over the major part of the circumference of both of said sealing rings, said retention device having at least one interruption extending in the circumferential direction; and an annular sleeve being disposed radially within said retention device, said sleeve having end portions which are bent obliquely outwardly toward said sealing rings, an inner surface of each of said end portions resting against said axially inner face of one of the sealing rings;

wherein, said retention device has two radially inwardly open, circumferentially extending grooves of approximately V-shape in cross-section, said V-shaped grooves being interrupted to match said interruptions in said retention device, an inner surface of one side wall of each of said grooves resting against an outer surface of the mutually facing sides of said bent end portions of said sleeve, and in a clamped position, an inner surface of the other side wall of each of said V-shaped grooves exerting an axial force on said axially outer face of each of said sealing rings.

2. The pipe coupling as claimed in claim 1, wherein a tapered cover ring is disposed between the inner surface of the other side wall of each of said V-shaped grooves and said axially outer face of said sealing rings, said axially outer faces of said sealing rings being directed away from one another toward opposite axial ends of said clip.

3. The pipe coupling as claimed in claim 2, wherein an axial end portion of said tapered cover ring overlaps an axial end portion of said bent axial end portion of said sleeve radially outside of the respective sealing ring against which they rest.

4. The pipe coupling as claimed in claim 1, wherein said retention device forms two radially inward projecting corrugation peaks at each of its axial end portions, the mutually adjacent side walls of said peaks forming the side walls of one of said V-shaped grooves.

5. The pipe coupling as claimed in claim 4, wherein said retention device is in the form of a collar that is interrupted in the circumferential direction and is disposed radially within said clip.

6. The pipe coupling as claimed in claim 4, wherein a generally conical retaining ring is disposed between an axially outer side wall of each of the axially outer corrugation peaks and each of said flanges of said clip strap, each of said flanges being bent radially inwardly towards an axial center line of the pipe coupling at each axial end of the clip, each of said flanges having at least one interruption, said retaining ring having, on its radially inner rim, claws for engaging into the pipe material, an axially inner surface of said retaining ring resting against an axially outer side wall of the axially outer corrugation peak of said two radially inward projecting corrugation peaks.

7. The pipe coupling as claimed in claim 6, wherein said axially outer side wall of each of the axially outer corrugation peaks merges into a radially outwardly projecting flattened corrugation peak, and said generally conical retaining ring rests in an axially outer bend of said radially outwardly projecting flattened corrugation peak.

8. The pipe coupling as claimed in claim 1, wherein said retention device has at least one length compensation corrugation.

9. The pipe coupling as claimed in claim 8, wherein the length compensation corrugation includes radial apertures.

10. The pipe coupling as claimed in claim 1, wherein said sealing rings are made of a heat-resistant material.

11. The pipe coupling as claimed in claim 1, wherein the sealing rings are made of graphite with annular metal lamellae embedded therein.

12. The pipe coupling as claimed in claim 1, wherein the sealing rings are made of a cold deformable metal.

13. The pipe coupling as claimed in claim 12, wherein the sealing rings have, on their radially inner surface, teeth for engaging into the pipe material.

14. The pipe coupling as claimed in claim 1, wherein the sealing rings are made of an elastomeric material.

15. The pipe coupling as claimed in claim 1, wherein said sleeve has a radial hole, a piece of tube being secured to a radially outer edge of said radial hole, said piece of tube extending radially outwardly through a pair of coaxial holes in the clip and the retention device, respectively.

16. The pipe coupling as claimed in claim 1, wherein the tension device includes only one clamping bolt.

17. The pipe coupling as claimed in claim 16, wherein said clamping bolt engages transversely in one of a pin and a sleeve rotatably mounted in each of said clamping jaws on the ends of said clip strap of said clamping clip.

18. The pipe coupling as claimed in claim 1, wherein, in the clamped position, a minimal radial clearance exists from the pipes to the remainder of said pipe coupling excluding said sealing rings and said retaining rings.

19. The pipe coupling as claimed in claim 1, wherein the retention device is secured on said clamping clip in an angular position relative to said clamping clip in which circumferential interruptions in said clip and said retention device are angularly spaced from one another.

* * * * *